(12) United States Patent
Rockey

(10) Patent No.: US 11,719,148 B2
(45) Date of Patent: Aug. 8, 2023

(54) FLUID TRANSFER CONNECTION INTERFACE DESIGN

(71) Applicant: Cummins Inc., Columbus, IN (US)

(72) Inventor: Shawn A. Rockey, Seymour, IN (US)

( * ) Notice: Subject to any disclaimer, the term of this patent is extended or adjusted under 35 U.S.C. 154(b) by 352 days.

(21) Appl. No.: 17/108,578

(22) Filed: Dec. 1, 2020

(65) Prior Publication Data

US 2021/0140358 A1     May 13, 2021

Related U.S. Application Data

(63) Continuation of application No. 16/142,517, filed on Sep. 26, 2018, now Pat. No. 10,883,403, which is a continuation of application No. PCT/US2017/029134, filed on Apr. 24, 2017.

(60) Provisional application No. 62/326,182, filed on Apr. 22, 2016.

(51) Int. Cl.
    *F16L 19/02*      (2006.01)
    *F01N 3/20*      (2006.01)

(52) U.S. Cl.
    CPC ........ *F01N 3/2066* (2013.01); *F16L 19/0212* (2013.01); *F16L 19/0231* (2013.01); *F16L 19/0237* (2013.01); *F01N 2610/02* (2013.01); *F01N 2610/14* (2013.01)

(58) Field of Classification Search
    CPC .............. F01N 2610/14; F16L 19/0212; F16L 19/0231; F16L 19/0237; F16L 19/0218; F16L 33/223
    See application file for complete search history.

(56) References Cited

U.S. PATENT DOCUMENTS

| 3,591,205 | A | | 7/1971 | Hamburg |
| 4,627,644 | A | * | 12/1986 | Ekman ............... F16L 37/0925 |
| | | | | 285/24 |
| 4,709,726 | A | | 12/1987 | Fitzgibbons |
| 4,768,538 | A | | 9/1988 | Mintz |

(Continued)

FOREIGN PATENT DOCUMENTS

| CN | 1108980496 A | 12/2018 |
| EP | 2455645 | 11/2010 |

(Continued)

OTHER PUBLICATIONS

Office Action, CN Application No. 202011465512.7, 10 pgs., dated Jun. 17, 2022.

(Continued)

*Primary Examiner* — Jonathan R Matthias
(74) *Attorney, Agent, or Firm* — Taft, Stettinius & Hollister LLP

(57) ABSTRACT

A diesel exhaust fluid transfer circuit providing a fluid transfer connector for securely connecting a port fitting of a diesel exhaust fluid device to a diesel exhaust fluid hose. The fluid transfer connector comprises an attachment nut attachable to a port fitting of the diesel exhaust fluid device. The fluid transfer connector further comprises a hose adapter including a fluid conduit and an annular wiper seal coaxially aligned with the fluid conduit. With the attachment nut attached to the port fitting, the fluid conduit is slidable over the port fitting and connectable to the attachment nut, and the annular wiper seal wipes any residue on the port fitting as the fluid conduit is slid over the port fitting.

19 Claims, 3 Drawing Sheets

(56) References Cited

U.S. PATENT DOCUMENTS

| | | | |
|---|---|---|---|
| 5,110,158 A | 5/1992 | Sabo | |
| 5,310,227 A * | 5/1994 | Grinsteiner | F16L 19/0212 |
| | | | 285/348 |
| 8,662,909 B2 | 3/2014 | Franke | |
| 2005/0081935 A1* | 4/2005 | Shimizu | F16L 37/0885 |
| | | | 138/109 |
| 2010/0018693 A1 | 1/2010 | Sutherland | |
| 2013/0306665 A1 | 11/2013 | Eberhardt et al. | |
| 2014/0138568 A1 | 5/2014 | van Vuuren et al. | |
| 2014/0290214 A1 | 10/2014 | Heichelbech et al. | |
| 2014/0319825 A1 | 10/2014 | Jones et al. | |
| 2018/0347731 A1 | 12/2018 | Kesler et al. | |
| 2019/0024559 A1 | 1/2019 | Rockey | |

FOREIGN PATENT DOCUMENTS

| | | |
|---|---|---|
| GB | 17810 | 1/1914 |
| WO | WO2009095477 | 8/2009 |

OTHER PUBLICATIONS

Chinese Office Action from Counter Chinese Application, CN Serial No. 201780024650.1, dated Apr. 16, 2021, 8 pgs.

Search Report and Written Opinoin, PCT Appln. No. PCT/US17/029134, dated Jul. 6, 2017. 9 pgs.

Chinese Office Action from Counter Chinese Application, CN Series No. 201780024650.1, dated Jan. 21, 2020, 11 pgs.

* cited by examiner

US 11,719,148 B2

FLUID TRANSFER CONNECTION INTERFACE DESIGN

CROSS-REFERENCE TO RELATED APPLICATIONS

The present application is a continuation of U.S. Utility application Ser. No. 16/142,517 filed on Sep. 26, 2018, which is a continuation of PCT Application No. PCT/US17/29134 filed on Apr. 24, 2017, which claims the benefit of the filing date of U.S. Provisional App. Ser. No. 62/326,182 filed on Apr. 22, 2016, each of which is incorporated herein by reference in its entirety.

TECHNICAL FIELD

The present disclosure relates generally to selective catalytic reduction (SCR) technology, and more particularly but not exclusively to diesel fluid exhaust transfer circuits including a doser for injecting diesel exhaust fluid into a SCR system.

BACKGROUND

The purpose of a SCR system is to reduce levels of oxides of nitrogen (NOX) emitted from an engine that are harmful to the environment. More particularly, a SCR system is the aftertreatment technology that treats exhaust gas downstream of the engine whereby the doser is operated to inject specified quantities of diesel exhaust fluid (DEF) into the exhaust upstream of a SCR catalyst that vaporizes and decomposes the DEF to form ammonia (NH3) and carbon dioxide (CO2). The NH3 is desired within the SCR system for converting the NOx to harmless nitrogen (N2) and water (H2O).

Existing efforts to comply diesel fluid exhaust transfer circuits with industry standards, particularly for high horsepower engine markets, suffer from a number of drawbacks, limitations and shortcomings. There remains a significant need for the unique diesel fluid exhaust transfer circuits disclosed herein.

SUMMARY

Unique diesel exhaust fluid transfer circuits providing a fluid transfer connector for securely connecting a port fitting of a diesel exhaust fluid device (e.g., a tank, a pump or a doser) to a diesel exhaust fluid hose. In one embodiment, the fluid transfer connector comprises an attachment nut attachable to a port fitting of the diesel exhaust fluid device. The fluid transfer connector further comprises a hose adapter including a fluid conduit and an annular wiper seal coaxially aligned with the fluid conduit. With the attachment nut attached to the port fitting, the fluid conduit is slidable over the port fitting and connectable to the attachment nut, and the annular wiper seal wipes any residue on the port fitting as the fluid conduit is slid over the port fitting.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1A:
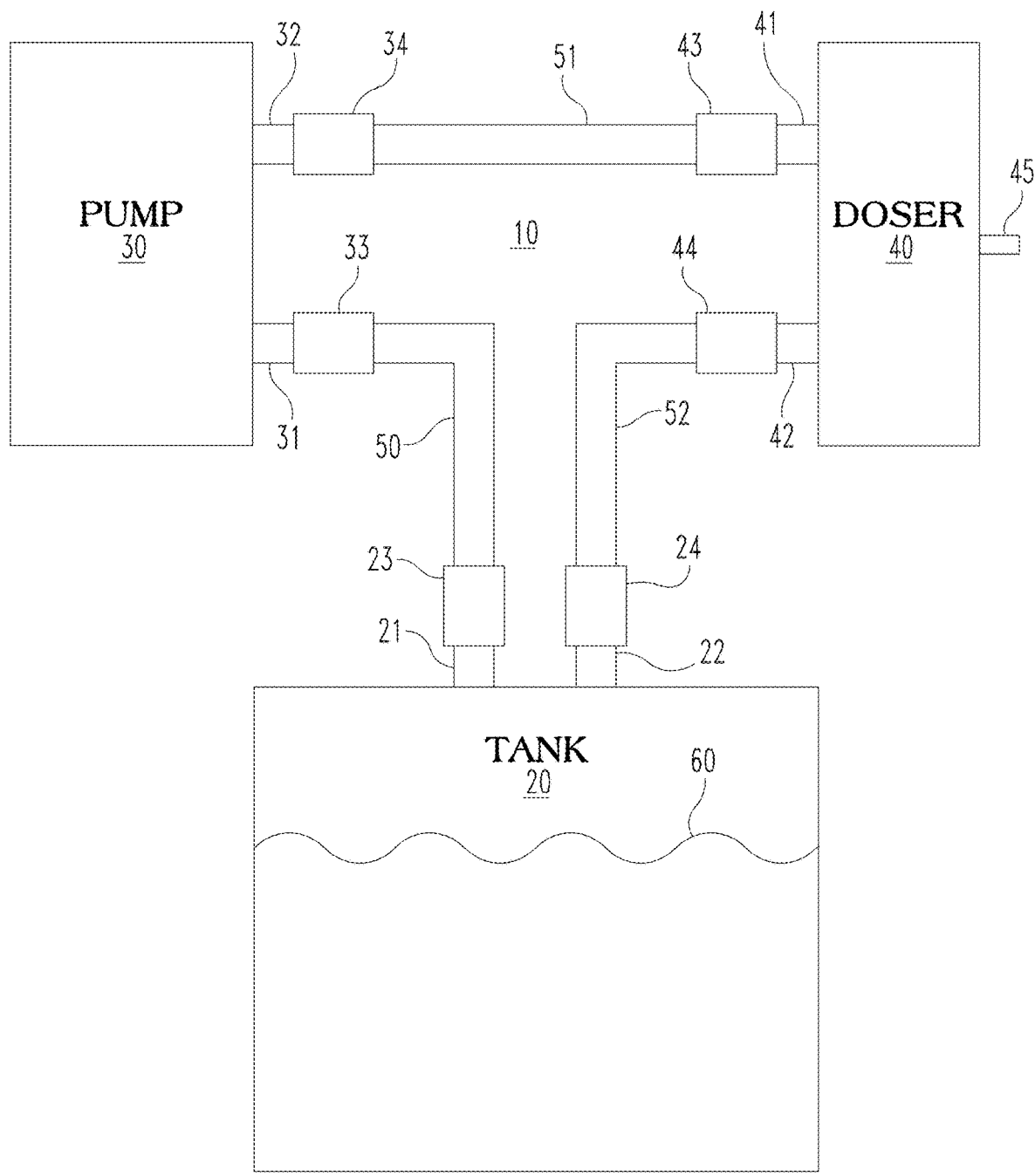
FIG. 1A is a block diagram of a diesel exhaust fluid transfer circuit of the present disclosure absent any fluid flow through the circuit and FIG. 1B is a block diagram of the diesel exhaust fluid transfer circuit of the present disclosure illustrative of a fluid flow through the circuit.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1A, a block diagram of a diesel exhaust fluid transfer circuit 10 of diesel exhaust fluid devices including a tank 20, a pump 30 and a doser 40.

An outlet port fitting 21 of tank 20 is connected via a fluid transfer connector 23, a hose 50 and a fluid transfer connector 33 to an inlet port filling 31 of pump 30.

An outlet port fitting 32 of pump 30 is connected via a fluid transfer connector 34, a hose 51 and a fluid transfer connector 43 to an inlet port fitting 41 of doser 40.

An outlet port fitting 42 of doser 40 is connected via a fluid transfer connector 44, a hose 52 and a fluid transfer connector 24 to an inlet port fitting 22 of tank 20.

Figure 1B:
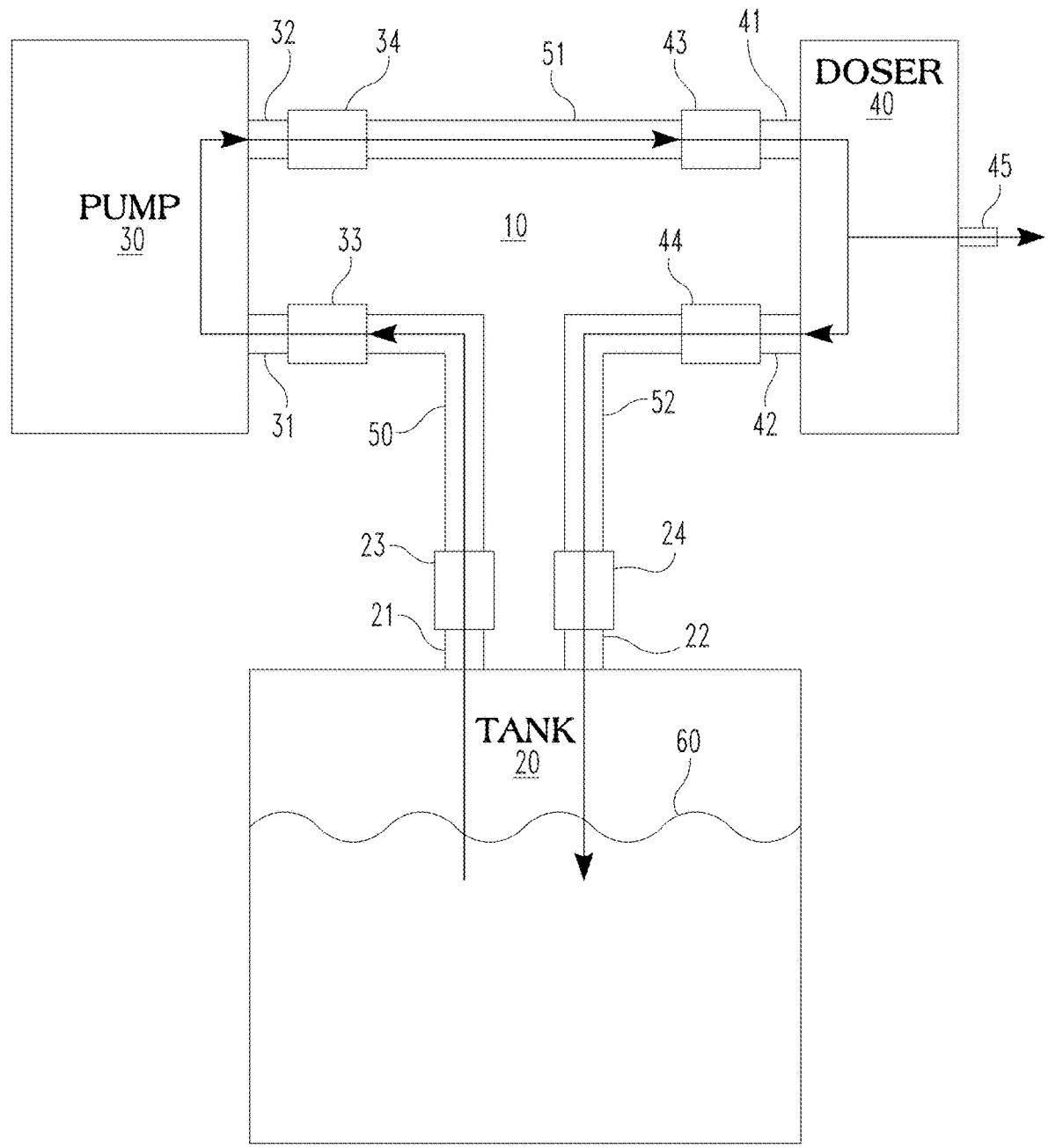

In fluid operation as shown in FIG. 1B, tank 20 contains a diesel exhaust fluid (DEF) 60 serving as a reactant necessary for a functionality of a selective catalytic reduction (SCR) system (not shown). In one embodiment, DEF 60 is a blended aqueous urea solution of 32.5% high purity urea and 67.5% deionized water whereby the urea is a compound of nitrogen that turns to ammonia when heated.

The port fittings and the hoses are configured to facilitate a protected transfer of DEF 60 between tank 20, pump 30 and doser 40. In one embodiment, each port fitting has a standard male configuration that is sized to ensure protection of an associated diesel exhaust fluid device.

The fluid transfer involves pump 30 extracting DEF 60 from tank 20 and applying the extracted DEF 60 at a specified degree of pressure (e.g., 145 psi) to inlet port fitting 41 of doser 40 to maintain doser 40 at a cool operating temperature. Doser 40 is controlled to inject a specified quantity of DEF 60 via an injector 45 into an exhaust catalyst or aftertreatment system (not shown). Any residual DEF 60 remaining in doser 40 upon an injection of DEF 60 into the exhaust catalysis is returned by doser 40 to tank 20.

In practice, fluid transfer connectors 23, 24, 33, 34, 43 and 44 must be compatible with DEF 60, provide a robust seal of the port fittings and be capable of withstanding rigors of a harsh environment, particularly for high horsepower environments.

Figure 2:
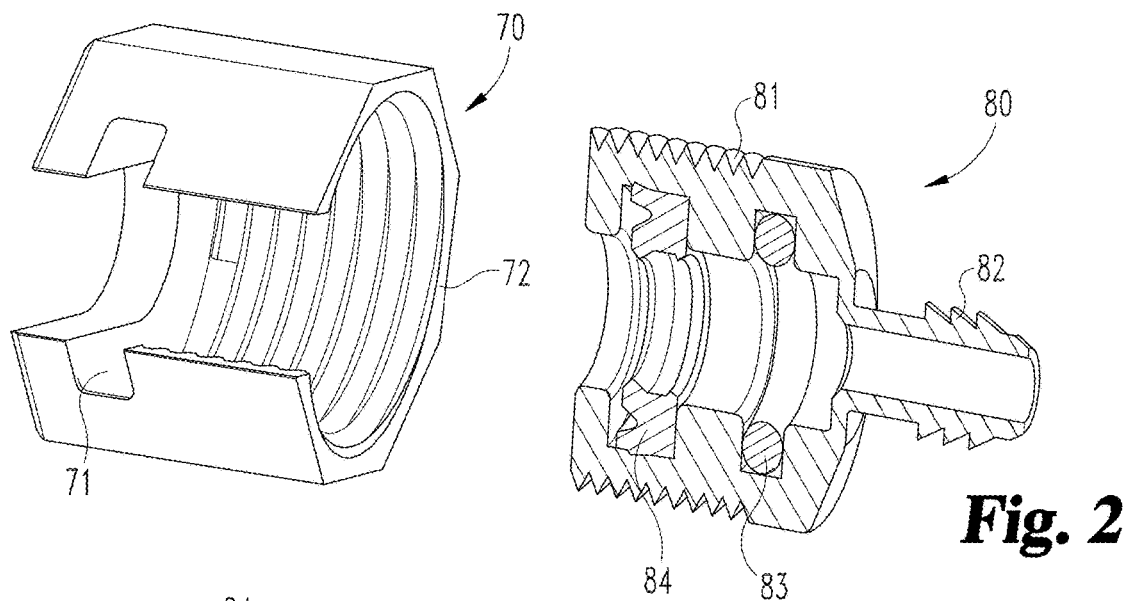
FIG. 2 is a perspective cross-sectional view of a fluid transfer connector of the present disclosure.

With reference to FIG. 2, an embodiment of a fluid transfer connector (e.g., fluid transfer connectors 23, 24, 33, 34, 43 and 44 of FIGS. 1A and 1B) includes an attachment nut 70 and a hose adapter 80, both having a stainless steel and/or plastic material composition.

Attachment nut 70 includes a slotted clamp 71 and a threaded ring 72.

Hose adapter 80 includes a fluid conduit formed by a threaded ring 81 and an annular hose interface 82.

Threading ring 81 seats an O-ring seal 83 and a wiper seal 84.

Figure 3:
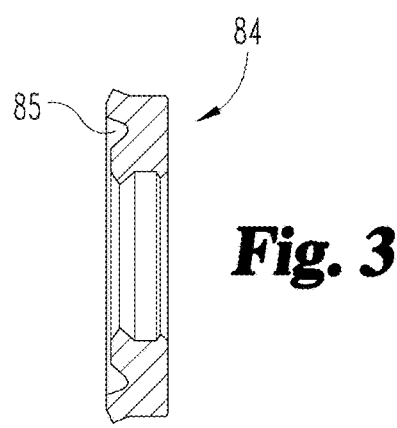
FIG. 3 is a cross-sectional view of an annular wiper seal of the present disclosure.

With reference to FIG. 3, wiper seal 84 is an annular ring having an annular flexible groove 85.

Figure 4:
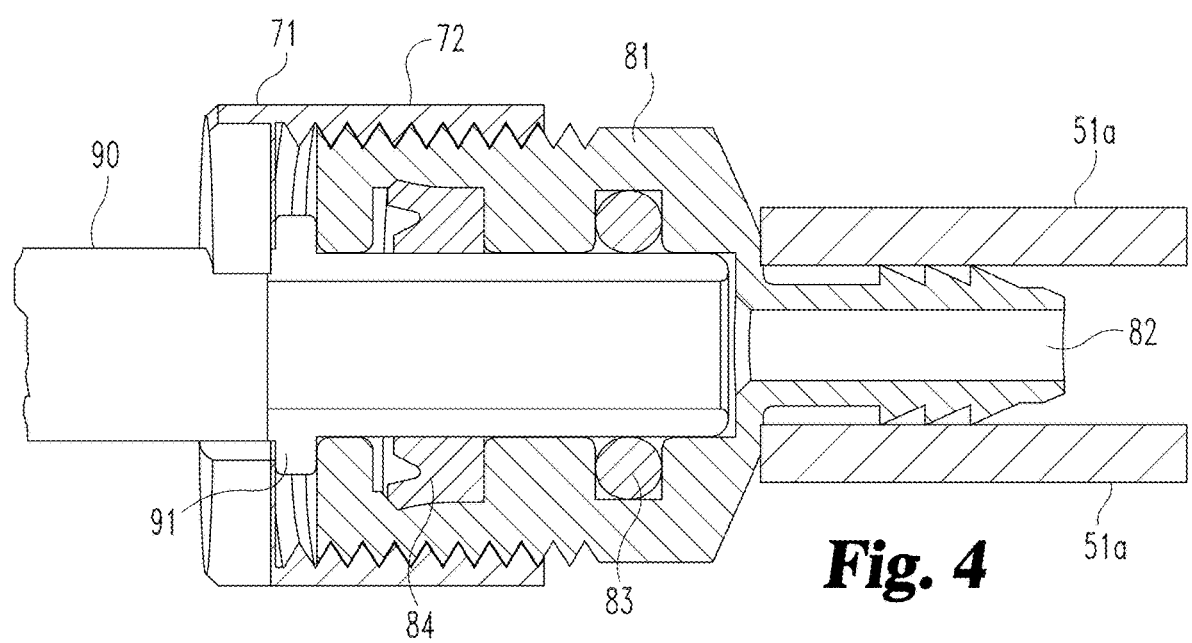
FIG. 4 is a cross-sectional view of the fluid transfer connector of FIG. 2 mounted on a fluid injector.

With reference to FIG. 4, in assembly, attachment nut 70 is clamped onto a stop 91 of a male port fitting 90. Subsequently, the fluid conduit of hose adapter 80 is slid on to male port fitting 90 and screwed within attachment nut 70 whereby seals 83 and 84 form tight seals with groove 85 of wiper seal 84 expanding to wipe any residue on the exterior surface of male port fitting 90 to facilitate a stronger, longer lasting seal for O-ring 83. Thereafter, a hose (e.g., hose 51a as shown) is interlocked to the fluid conduit of hose adapter 80 via a friction fit over hose interface 82.

Referring back to FIGS. 1A and 1B, the incorporation of one or more fluid transfer connectors within diesel exhaust fluid transfer circuit 10 is very beneficial to the efficient operation of circuit 10. In practice, tank 20, pump 30 and doser 40 may be segregated as shown, or integrated as desired. Furthermore, additional devices may be added to circuit 10 as needed.

As is evident from the figures and text presented above, a variety of aspects of the present invention are contemplated. According to one aspect, a fluid transfer connector comprises an attachment nut attachable to a port fitting of a diesel exhaust fluid device (e.g., an input port fitting or an output port fitting of a tank, a pump or a doser). The fluid transfer connector further comprises a hose adapter including a fluid conduit and an annular wiper seal coaxially aligned with the fluid conduit. With the attachment nut attached to the port fitting of the diesel exhaust fluid device, the fluid conduit is slidable over the port fitting and connectable to the attachment nut whereby the annular wiper seal wipes any residue on the port fitting as the fluid conduit is slid over the port fitting.

According to a second aspect, a diesel exhaust fluid transfer circuit comprises a diesel exhaust device having an output port fitting (e.g., an output port fitting of a tank, a pump or a doser). The circuit further comprises a diesel exhaust fluid hose and a fluid transfer connector.

The fluid transfer connector includes an attachment nut attached to the output port fitting of the diesel exhaust fluid device.

The fluid transfer connector further includes a hose adapter including a fluid conduit slid over the output port fitting, connected to the attachment nut and interlocked with the diesel exhaust fluid hose.

The hose adapter further includes an annular wiper seal coaxially aligned with the fluid conduit for wiping any residue on the output port fitting as the fluid conduit is slid over the output port fitting.

According to a third aspect, a diesel exhaust fluid transfer circuit comprises a diesel exhaust device having an input port fitting (e.g., an input port fitting of a tank, a pump or a doser). The circuit further comprises a diesel exhaust fluid hose and a fluid transfer connector.

The fluid transfer connector includes an attachment nut attached to the input port fitting of the diesel exhaust fluid device.

The fluid transfer connector further includes a hose adapter including a fluid conduit slid over the input port fitting, connected to the attachment nut and interlocked with the diesel exhaust fluid hose.

The hose adapter further includes an annular wiper seal coaxially aligned with the fluid conduit for wiping any residue on the input port fitting as the fluid conduit is slid over the input port fitting.

According to a fourth aspect, a diesel exhaust fluid transfer circuit comprises a first diesel exhaust device having an output port fitting and a second diesel exhaust device having an input port fitting (e.g., a tank-pump pairing, a pump-doser pairing or a doser-tank pairing). The circuit further comprises a diesel exhaust fluid hose and a pair of fluid transfer connectors.

The first fluid transfer connector includes a first attachment nut attached to the output port fitting of the first diesel exhaust fluid device.

The first fluid transfer connector further includes a first hose adapter including a first fluid conduit slid over the output port fitting, connected to the first attachment nut and interlocked with the diesel exhaust fluid hose.

The first hose adapter further includes a first annular wiper seal coaxially aligned with the first fluid conduit for wiping any residue on the output port fitting as the first fluid conduit is slid over the output port fitting.

The second fluid transfer connector includes a second attachment nut attached to the input port fitting of the second diesel exhaust fluid device.

The second fluid transfer connector further includes a second hose adapter including a second fluid conduit slid over the input port fitting, connected to the second attachment nut and interlocked with the diesel exhaust fluid hose.

The second hose adapter further includes a second annular wiper seal coaxially aligned with the second fluid conduit for wiping any residue on the input port fitting as the second fluid conduit is slid over the input port fitting.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A fluid transfer connector, comprising:
a port fitting attached to a fluid device, wherein the fluid device is one of a tank, a pump and a diesel exhaust fluid doser, the port fitting including a stop extending outwardly therefrom;
an attachment nut clamped to the stop of the port fitting; and
a hose adapter positioned within and extending from the attachment nut, the hose adapter including a fluid conduit and a first seal and a second seal that are each seated in and coaxially aligned with the fluid conduit, the hose adapter including an annular hose interface extending axially from one end thereof opposite of the port fitting for engagement to a fluid hose.

2. The fluid transfer connector of claim 1, wherein the fluid conduit is interlockable with the fluid hose via the annular hose interface.

3. The fluid transfer connector of claim 1, wherein the attachment nut includes a slotted clamp that is clamped onto the stop.

4. The fluid transfer connector of claim 1, wherein the first seal of the hose adapter is a wiper seal and the second seal is an O-ring seal.

5. The fluid transfer device of claim 1, wherein at least one of the attachment nut and the hose adapter are made from stainless steel.

6. The fluid transfer device of claim 1, wherein each of the attachment nut and the hose adapter are made from stainless steel.

7. The fluid transfer connector of claim 1, wherein:
the attachment nut includes an end opening and a side opening, the side opening receiving the port fitting and the stop to position the port fitting and the stop into the attachment nut, wherein the attachment nut is clamped to the stop of the port fitting; and
the hose adapter is positioned within and extends from the end opening of the attachment nut.

8. A fluid transfer device, comprising:
a fluid hose and a fluid transfer connector connected to the fluid hose, the fluid transfer connector including:
  a hose adapter secured to the fluid hose, the hose adapter including a fluid conduit and an annular hose interface extending axially from one end thereof;
  an attachment nut positioned around the hose adapter opposite the fluid hose, the attachment nut further engageable to a male port fitting;
  a first seal seated within the hose adapter configured to sealingly engage the male port fitting positioned in the hose adapter; and
  an O-ring seal within the hose adapter configured to sealingly engage the male port fitting positioned in the hose adapter,
  wherein the male port fitting includes a stop extending outwardly therefrom that is clamped onto by the attachment nut.

9. The fluid transfer device of claim 8, wherein at least one of the attachment nut and the hose adapter are made from stainless steel.

10. The fluid transfer device of claim 8, wherein each of the attachment nut and the hose adapter are made from stainless steel.

11. The fluid transfer connector of claim 8, wherein the fluid conduit is interlockable with the fluid hose via the annular hose interface.

12. The fluid transfer connector of claim 8, wherein the attachment nut includes a slotted clamp that is clamped onto the stop.

13. The fluid transfer connector of claim 8, wherein the attachment nut includes a threaded ring and is threadingly engaged to the hose adapter.

14. The fluid transfer device of claim 8, wherein the attachment nut includes an end opening and a side opening, the side opening receiving the port fitting and the stop to position the port fitting and the stop into the attachment nut and the hose adapter is engaged to the attachment nut through the end opening.

15. A fluid transfer device, comprising:
a fluid hose for diesel exhaust fluid and a fluid transfer connector connected to the fluid hose, the fluid transfer connector including:
  a stainless steel hose adapter secured to the fluid hose, the hose adapter including a fluid conduit and an annular hose interface extending axially from one end thereof;
  a stainless steel attachment nut positioned around the hose adapter opposite the fluid hose, the attachment nut further engageable to a male port fitting of a fluid device, wherein the fluid device is one of a tank, a pump and a diesel exhaust fluid doser for the diesel exhaust fluid;
  a first seal seated within the hose adapter configured to sealingly engage the male port fitting positioned in the hose adapter; and
  an O-ring seal within the hose adapter configured to sealingly engage the male port fitting positioned in the hose adapter,
  wherein the male port fitting includes a stop extending outwardly therefrom that is clamped onto by the attachment nut.

16. The fluid transfer connector of claim 15, wherein the fluid conduit is interlockable with the fluid hose via the annular hose interface.

17. The fluid transfer connector of claim 15, wherein the attachment nut includes a slotted clamp that is clamped onto the stop.

18. The fluid transfer connector of claim 15, wherein the attachment nut includes a threaded ring and is threadingly engaged to the hose adapter.

19. The fluid transfer device of claim 15, wherein the attachment nut includes an end opening and a side opening, the side opening receiving the port fitting and the stop to position the port fitting and the stop into the attachment nut and the hose adapter is engaged to the attachment nut through the end opening.

* * * * *